United States Patent
Nzomigni et al.

(10) Patent No.: US 6,615,503 B1
(45) Date of Patent: Sep. 9, 2003

(54) CALIBRATION SOFTWARE FOR SURFACE RECONSTRUCTION OF SMALL OBJECTS

(75) Inventors: Victor Nzomigni, Rennes Carre (FR); Donald Wagner Hamilton, Burnt Hills, NY (US); James Vradenburg Miller, Clifton Park, NY (US); Peter Henry Tu, Schenectady, NY (US); Glen William Brooksby, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/063,362

(22) Filed: Apr. 16, 2002

(51) Int. Cl.[7] .............................................. G01D 21/00
(52) U.S. Cl. ............................ 33/520; 33/644; 33/502; 33/567; 33/567.1; 73/1.79; 702/95
(58) Field of Search .......................... 33/520, 644, 502, 33/567, 567.1; 73/1.79; 702/95, 104, 141, 145

(56) References Cited

U.S. PATENT DOCUMENTS

| | | | | |
|---|---|---|---|---|
| 3,237,442 A | * | 3/1966 | De Vos ........................ 73/1.79 |
| 5,095,635 A | * | 3/1992 | Iwasaki ........................ 33/644 |
| 5,359,784 A | * | 11/1994 | Tomida et al. ................. 33/520 |
| 5,452,521 A | * | 9/1995 | Niewmierzycki ............. 33/520 |
| 5,589,942 A | | 12/1996 | Gordon ....................... 356/376 |
| 5,621,529 A | | 4/1997 | Gordon et al. .............. 356/376 |
| 5,913,820 A | * | 6/1999 | Bladen et al. .............. 600/407 |
| 6,166,687 A | * | 12/2000 | Ishikawa et al. ........ 342/357.16 |
| 6,427,856 B1 | * | 8/2002 | Allen ........................... 33/520 |
| 6,473,985 B2 | * | 11/2002 | Won et al. .................... 33/644 |
| 6,496,784 B1 | * | 12/2002 | Dukart et al. ................. 702/95 |
| 6,546,640 B2 | * | 4/2003 | Okada et al. ................. 33/502 |

OTHER PUBLICATIONS

Kinoshita et al., U.S. patent application Publication US 2002/0038516, Apr. 4, 2002, see entire document.*

* cited by examiner

Primary Examiner—Diego Gutierrez
Assistant Examiner—Amanda J Hoolahan
(74) Attorney, Agent, or Firm—Jean K. Testa; Patrick K. Patnode

(57) ABSTRACT

A method for determining the axis of rotation (AR) of an object (12) mounted to a rotary stage or platform (10) in a gauge measurement system by estimating a transformation ($\delta$) between multiple views or measurements of the object (12) obtained at different poses.

16 Claims, 2 Drawing Sheets

CALIBRATION SOFTWARE FOR SURFACE RECONSTRUCTION OF SMALL OBJECTS

BACKGROUND OF INVENTION

The present invention relates to a method for the reconstruction and recovery of the three-dimensional shape of an imaged object in a gauge measurement system, and more specifically, to a robust and accurate method for estimating the motion of an measured object mounted on a rotary stage.

Traditionally, in a gauge measurement system, such as a non-contact optical measurement system or coordinate measuring machine (CMM), an object to be measured is mounted on a rotary stage or platform. A rotary stage or platform is a mounting apparatus which is constrained to permit only movement about a single axis. Multiple views or contact measurements of the object are obtained by imaging or contacting the object at different poses. A calibration process is then utilized to provide a means to coherently merge the data taken at those views or measurements (recorded in local coordinate systems) into a single global coordinate system.

Conventional calibrations processes utilize plane intersections to coherently merge local coordinate systems into a global coordinate system. In such processes, a known planar object is mounted on the rotary stage or platform, a series of range images or sets of contact measurements of the object are obtained at different positions of the rotary stage. The data points from each rotary position are each fitted to an associated plane using a simple linear regression scheme. Intersecting pairs of the planes form vectors in space parallel to the axis of rotation. Combining these intersecting vectors yields the axis of rotation. So long as the rotary stage or platform is rigidly secured in relation to the sensor, and the calibration of the sensor does not subsequently change, the axis of rotation is fixed such that any object mounted to the rotary stage or platform is constrained to rotate about the same identified axis.

The precision and robustness of any rotational axis estimation scheme depends upon the amount of uncorrelated (useful) data input to the system. Accordingly, there is a need for a method to accurately estimate the axis of rotation for a rotary stage or platform from multiple views or measurements of an object which provides an increase in the amount of data input to the system.

SUMMARY OF INVENTION

Briefly stated, the present invention provides a method for determining the axis of rotation of an object mounted to a rotary stage or platform in a gauge measurement system by estimating a transformation between multiple views or measurements of the object obtained at different poses.

The foregoing and, other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

DETAILED DESCRIPTION

Figure 1:
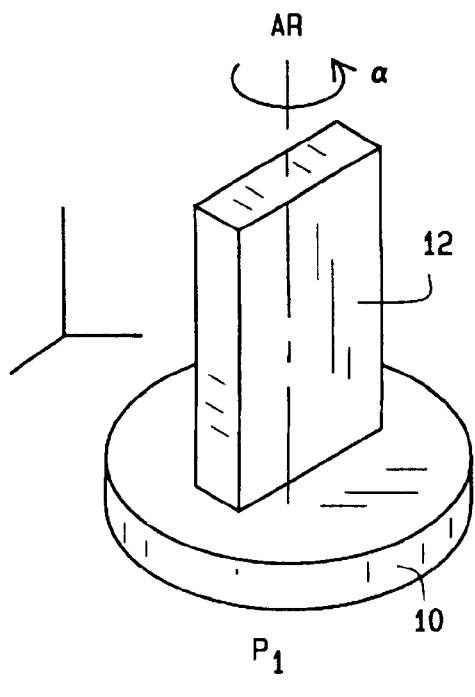
FIG. 1 is a perspective view of a calibration object mounted on a rotary stage at a first orientation.
Figure 2:
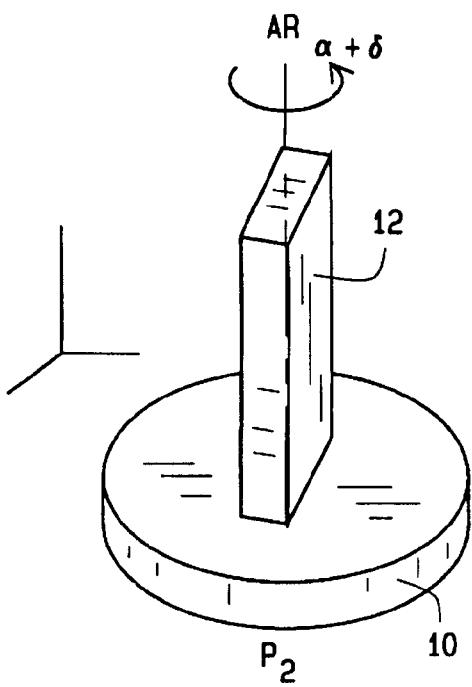
FIG. 2 is a perspective view of the calibration object of FIG. 1 at a second orientation.
Figure 3:
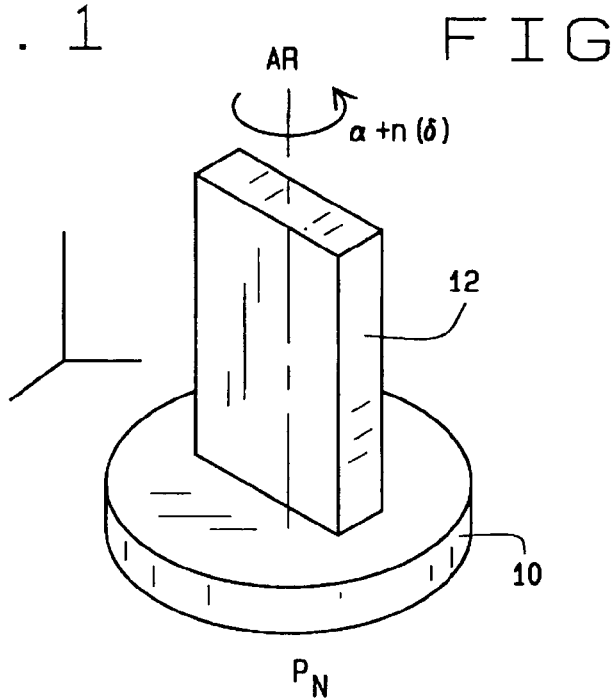
FIG. 3 is a perspective view of the calibration object of FIG. 1 at a third orientation.

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

The present invention provides a method for determining the axis of rotation of a rotary stage or platform using a known calibration object and a robust registration scheme. In one embodiment, a Robust Closest Patch (RCP) scheme is utilized to estimate the transformation between multiple poses of the object being measured. Alternatively, an iterative closest patch (ICP) scheme, or other known scheme may be utilized to estimate the transformation between multiple poses of the object 12.

The known calibration object is designed in conjunction with the type of sensor undergoing calibration. Specifically, when mounted on the rotary stage or platform 10, a large area of the calibration object 12 must be visible to a camera based sensor or accessible to a contact based sensor in a wide range of poses or positions, without being occluded. The calibration object 12 is preferably centered at the suited-point of the sensor and should be large enough to cover the working volume of the sensor, as the accuracy of the calibration will increase with the average arm length of the calibration object 12, as measured from the center of rotation. To avoid reducing available information identifying the pose of the calibration object 12, it is preferred that the calibration object 12 not be round, and include a multiple number of large facets to avoid aliasing effects. Further, the facets are either visible to a camera based sensor or accessible to a contact sensor.

Each pose of the calibration object 12 in a sequence is defined as $P_1, P_2, \ldots, P_k, \ldots P_n$. Each pose of the calibration object 12 differs from the previous pose by a constant rigid body increment $\delta$, such that $P_2 = \delta P_1$, $P_k = \delta P_{k-1}$, and $P_n = \delta P_{n-1}$. The angle of rotation is preferably selected to be small enough to enforce a small amount of overlap between succeeding poses of the calibration object 12. From the data for $P_k$ and $P_{k-1}$ the transformation $\delta$ can be estimated independently using the RCP algorithm or any other registration scheme.

By combining all the data from each pose of the calibration object 12 with the same set of constraints, and using the data for a joint estimation, a more accurate and stable solution for $\delta$ can be found. The transformation $\delta$, as a rigid body transform, can be decomposed into a rotation R around the origin point, and a translation T:

$$\delta = T(t) \times R(\omega, \theta) \qquad \text{Eqn. (1)}$$

where:

ω is the direction of the axis of rotation;

θ is the angle of rotation; and t is the translation vector.

Figure 4:
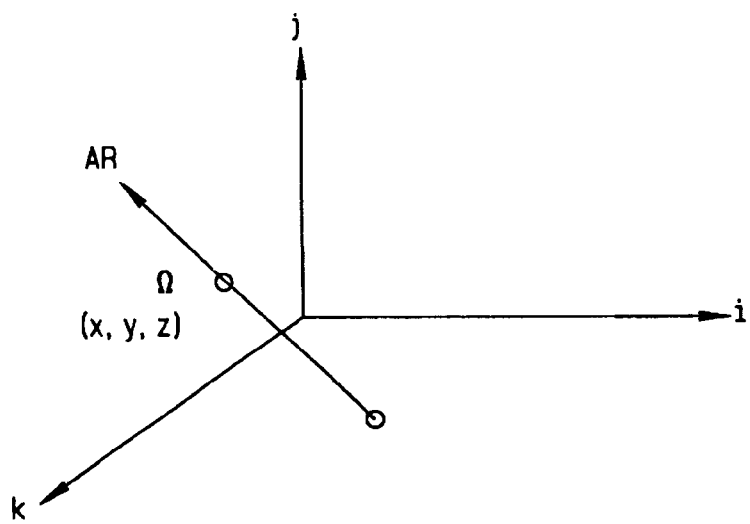
FIG. 4 is a first coordinate system representation of the rotary stage axis of rotation.
Figure 5:
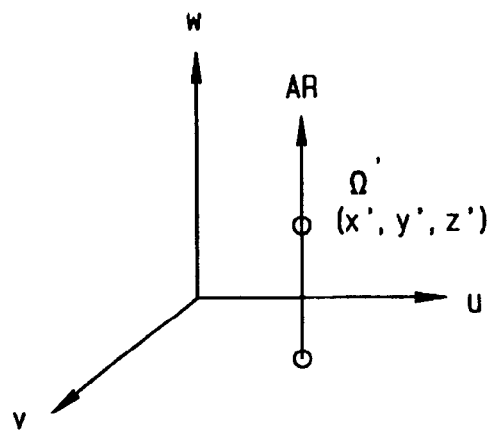
FIG. 5 is a second coordinate system representation of the rotary stage axis of rotation.

The direction of the axis of rotation is extracted from the estimated rotation by computing the quaternion equivalent of the rotation matrix. Using a quaternion argument, a point in an (i, j, k) coordinate system, such as the camera coordinate system, can be transformed into a (u, v, ω) coordinate system wherein the ω-axis is parallel to the axis of rotation of the rotary stage 10. To find a point (x, y, z)=Ω which is on the axis of rotation AR, it is known that any point on the axis of rotation AR will be rotated onto itself. The center of rotation, i.e. any point on the rotation axis, is determined as an invariant point, written using matrix notation as:

$$R\Omega+T=\Omega \quad \text{Eqn. (2)}$$

where Ω is the center of rotation. If Ω is transformed into the (u, v, ω) coordinate system, it is defined as Ω'=(x', y', z'), as is seen in FIGS. 4 and 5.

To avoid the inversion of a singular matrix, and appropriate rotation is applied to the original three-dimensional space, which reduces the three-dimensional singular problem to a two-dimensional non-singular one.

The original coordinate system for an image of the calibration object 12 is defined as C=(i, j, k). Correspondingly, the rotated coordinate system for the object is defined as C'=(U, V, ω) where u, v, and ω form an orthogonal-normal basis, and ω is the unit vector along the axis of rotation AR. The center of rotation in the rotated space is given coordinates Ω', such that:

$$\Omega=A\Omega' \quad \text{Eqn. (3)}$$

where A is the rotation from the coordinate system C' to C. Using a quaternion argument, it is possible to compute A such that a point in the (i, j, k) coordinate system can be transformed into the (u, v, ω) coordinate system.

Replacing equation (3) into equation (2), with results in:

$$R'\Omega'T'=\Omega' \quad \text{Eqn. (4)}$$

where:

$$R'=A^tRA \quad \text{Eqn. (5)}$$

$$T'=A^tT \quad \text{Eqn. (6)}$$

and R' is a rotation around the vertical axis. Equation (4) can be rewritten in matrix form as:

$$\begin{pmatrix} \cos\theta & \sin\theta & 0 \\ -\sin\theta & \cos\theta & 0 \\ 0 & 0 & 1 \end{pmatrix}\begin{bmatrix} x' \\ y' \\ z' \end{bmatrix} + \begin{bmatrix} t'_x \\ t'_y \\ t'_z \end{bmatrix} = \begin{bmatrix} x' \\ y' \\ z' \end{bmatrix} \quad \text{Eqn. (7)}$$

which has a solution if and only if $t'_z=0$ and $\cos\theta \neq 1$.

Figure 6:
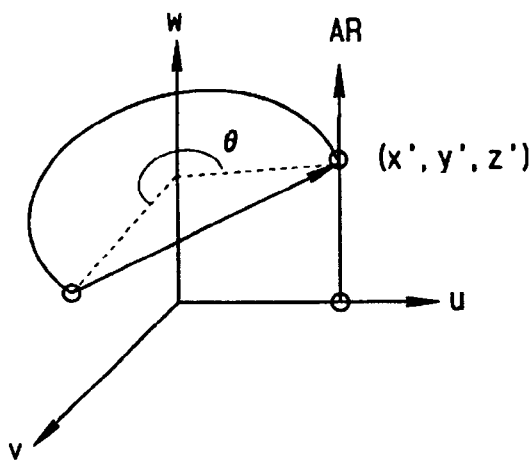
FIG. 6 is a representation of a coordinate transformation in three-dimensional space.

The condition $\cos\theta \neq 1$ is utilized to avoid the identity transform which is a particular rotation that does not yield any axis of rotation. The condition $t_z=0$ agrees with the geometrical intuition of pure rotation, i.e. the trajectories of points rigidly attached to a rotary stage under a rotation are arcs of circles in planes perpendicular to the axis of rotation, as seen in FIG. 6. However, the rotary stage or platform 10 is likely to be imperfect, hence the parameter $t_z$ is exploited to check the planarity of the motion of the rotary stage or platform, and any $t_z \approx 0$ it is set to zero.

Since $t'_x$, $t'_y$, and θ are known from the solutions to Eqn. 5 and Eqn. 6, it is possible to solve Eqn. 7 for x' and y' by assuming z' is any value. The assumption of z' having any value is valid, since z' merely represents the location of the point on the axis or rotation AR, and any point on the axis may be utilized. Solving the above system of equations yields the following analytical solutions:

$$x' = \frac{t'_x(1-\cos\theta)+t'_y\sin\theta}{2(1-\cos\theta)} \quad \text{Eqn. (8)}$$

$$y' = \frac{t'_y(1-\cos\theta)-t'_x\sin\theta}{2(1-\cos\theta)} \quad \text{Eqn. (9)}$$

$$z'=\text{any value} \quad \text{Eqn. (10)}$$

Once x' and y' are identified, Eqn. 3 can be solved for the coordinates of point Ω on the axis of rotation AR. Since the direction of the axis of rotation AR is also known, the rotary stage is completely defined mathematically.

In an alternative embodiment, starting from the estimated transformation δ, the transformation is represented as a matrix with coordinate points represented as vectors. The direction of the axis of rotation AR and the point T on the axis of rotation AR are invariant to the various parts of the transformation process. In particular, the direction of the axis of rotation AR is an eigenvector corresponding to an eigenvalue of +1.0 of the rotation R since it is invariant to the rotation. Similarly, the point T on the axis of rotation AR is invariant to the transformation, and thus is an eigenvector corresponding to an eigenvalue of +1.0 of the [R |T R*T] transformation. Those of ordinary skill in the art will recognize that there are numerous conventional techniques which may be employed to solve a matrix for eigenvectors having eigenvalues of 1.0, and which may be utilized to identify the direction of the axis of rotation AR and a point T on that axis given the estimated transform δ.

An alternative formulation is that there must be two eigenvectors of [R |T R*T] that have eignenvalues of +1. These two eigenvectors represent two points which are invariant to the transformation δ and hence are on the axis of rotation AR. Thus, and points on the axis of rotation AR are defined as a linear combination of these two eigenvectors.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

What is claimed is:

1. A method for determining an axis of rotation of a rotary stage upon which an object is rigidly mounted in a measurement system, comprising:

for each of a plurality of poses of said object incrementally rotated about said axis of rotation, obtaining a set measurements representative of said pose;

estimating, from sequential pairs of said sets of measurements, a rigid body transformation for the incremental rotation between each of said plurality of poses;

decomposing said estimated rigid body transformation into an estimated rotation value and an estimated translation value; and estimating the axis of rotation from said rotation value and said translation value.

2. The method of claim 1 for determining an axis of rotation of a rotary stage wherein estimating the axis of rotation from said rotation value includes computing the quaternion equivalent of a rotation matrix.

3. The method of claim 1 for determining an axis of rotation of a rotary stage wherein each of said sets of measurements representative of said pose are obtained by an imaging sensor.

4. The method of claim 1 for determining an axis of rotation of a rotary stage wherein each of said sets of measurements representative of said pose are obtained by a contact sensor.

5. The method of claim 1 for determining an axis of rotation of a rotary stage wherein the step of estimating the axis of rotation from said rotation value and said translation value includes the step of identifying the coordinates of a point on the axis of rotation.

6. The method of claim 5 wherein the point on the axis of rotation is identified in three-dimensional space relative to the rotary stage by:

$$x' = \frac{t'_x(1-\cos\theta) + t'_y\sin\theta}{2(1-\cos\theta)};$$

$$y' = \frac{t'_y(1-\cos\theta) - t'_x\sin\theta}{2(1-\cos\theta)};$$

z'=any value;

where
- t represents the translation vector;
- x' represents a coordinate of the point on the x" axis;
- y' represents a coordinate of the point on the y" axis;
- z' represents a coordinate of the point on the axis of rotation; and
- θ is the angle of incremental rotation.

7. The method of claim 6 wherein the point on the axis of rotation is identified in three-dimensional space relative to the measurement system by solving:

Ω=Ω' where
- Ω represents the three-dimensional coordinates of the point relative to the measurement system;
- Ω' represents the three-dimensional coordinates of the point relative to the rotary stage; and
- A represents a rotation from the rotary stage coordinate system to the measurement system coordinate system.

8. The method of claim 1 wherein said rigidly mounted object is comprised of multiple facets each facet being visible to a camera based sensor.

9. The method of claim 1 wherein said rigidly mounted object is comprised of multiple facets each facet being accessible to a contact sensor.

10. A method for determining an axis of rotation of a rotary stage upon which object is rigidly mounted in a measurement system, comprising:

for each of a plurality of poses of said object incrementally rotated about said axis of rotation, obtaining a set measurements representative of said pose;

estimating, from sequential pairs of said sets of measurements, a rigid body transformation for the incremental rotation between each of said plurality of poses;

decomposing said estimated rigid body transformation into an estimated rotation value and an estimated translation value;

computing a rotation for a point from a coordinate system defined relative to said measurement system to a coordinate system defined relative to said rotary stage;

utilizing said estimated rotation value and said estimated translation value to identify a point on said axis of rotation in said rotary stage coordinate system; and utilizing said rotation to represent said identified point in said measurement system coordinate system.

11. A method for determining an axis of rotation of a rotary stage upon which object is rigidly mounted in a measurement system, comprising:

for each of a plurality of poses of said object incrementally rotated about said axis of rotation, obtaining at least one measurement representative of said pose;

estimating, from at least one sequential pair of said sets of measurements, a rigid body transformation for the incremental rotation between each of said plurality of poses;

establishing a matrix from said rigid body transformation; and identifying two eigenvectors having eigenvalues equal to +1 within said established matrix, each of said eigenvectors representing a point invariant to said rigid body transformation.

12. The method of claim 11 for determining an axis of rotation of a rotary stage wherein each of said sets of measurements representative of said pose are obtained by an imaging sensor.

13. The method of claim 11 for determining an axis of rotation of a rotary stage wherein each of said sets of measurements representative of said pose are obtained by a contact sensor.

14. The method of claim 11 for determining an axis of rotation of a rotary stage wherein said at least one measurement representative of pose is a set of coordinates for a point on the surface of said object, said coordinates referenced to said measurement system.

15. The method of claim 11 for determining an axis of rotation of a rotary stage wherein each of said points represented by said eigenvectors are on the axis of rotation.

16. The method of claim 11 for determining an axis of rotation of a rotary stage wherein said rigid body transformation is represented as

[R |T R*T]

where:
- R is a rotation about an axis; and
- T is a point on the axis of rotation.

* * * * *

UNITED STATES PATENT AND TRADEMARK OFFICE
CERTIFICATE OF CORRECTION

PATENT NO. : 6,615,503 B1
DATED : September 9, 2003
INVENTOR(S) : Victor Nzomigni et al.

It is certified that error appears in the above-identified patent and that said Letters Patent is hereby corrected as shown below:

Column 5,
Lines 34-45, claim 7 should read as it was filed:

7. The method of Claim 6 wherein the point on the axis of rotation is identified in three-dimensional space relative to the measurement system by solving:
$$\Omega = A\Omega'$$
where
    $\Omega$ represents the three-dimensional coordinates of the point relative to the measurement system;
    $\Omega'$ represents the three-dimensional coordinates of the point relative to the rotary stage; and
    $A$ represents a rotation from the rotary stage coordinate system to the measurement system coordinate system.

Signed and Sealed this

Sixth Day of July, 2004

JON W. DUDAS
*Acting Director of the United States Patent and Trademark Office*